Patented Nov. 23, 1948

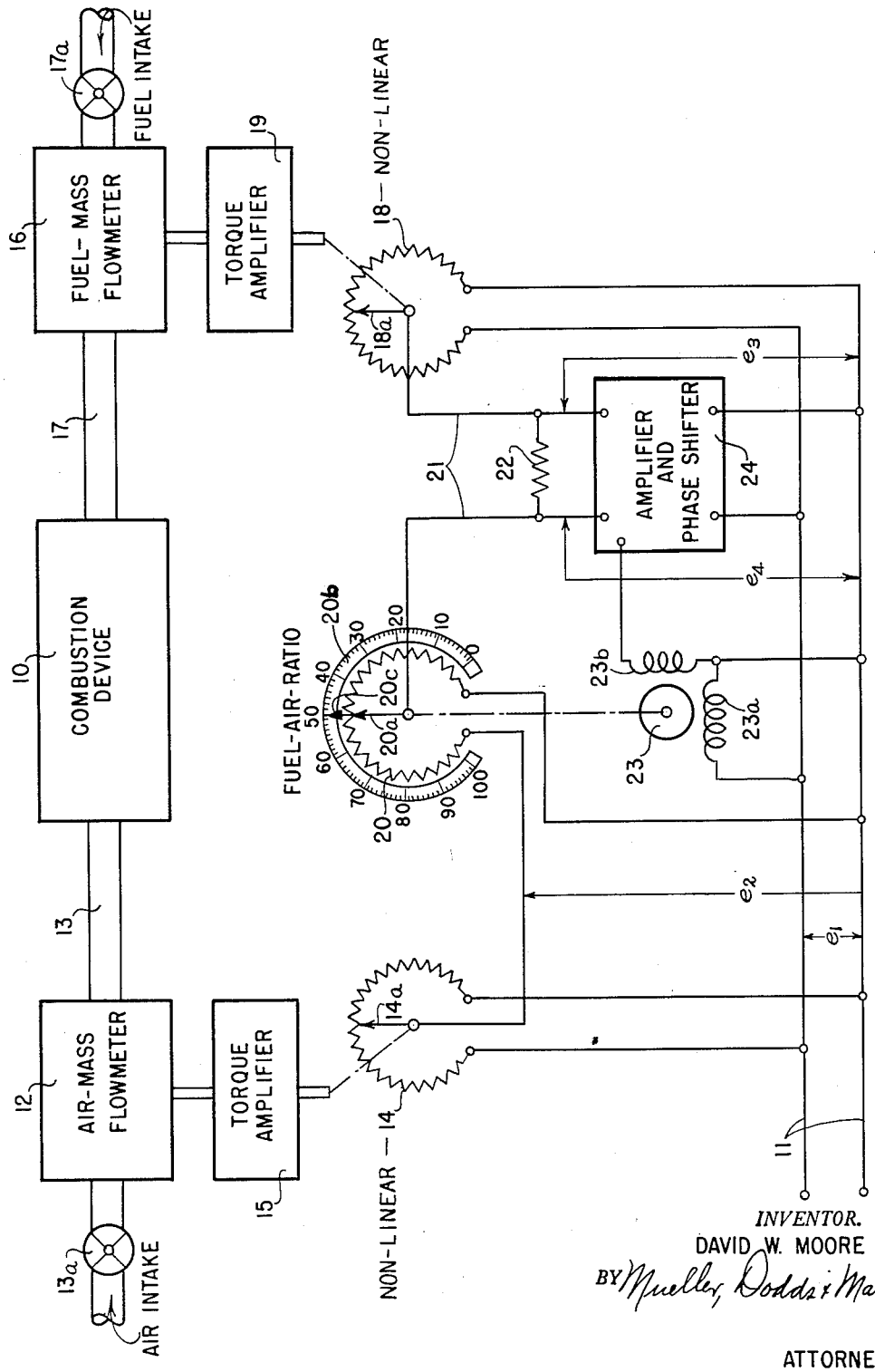

2,454,520

UNITED STATES PATENT OFFICE 2,454,520

RATIO-MEASURING SYSTEM

David W. Moore, Jr., New York, N. Y., assignor to Fairchild Camera and Instrument Corporation, a corporation of Delaware Application March 23, 1945, Serial No. 584,465

7 Claims. (Cl. 177—351)

This invention relates to ratio-measuring systems and more particularly to systems for measuring the fuel-air ratio of the input to a combustion device, such as an internal combustion engine.

It is well known that, in the operation of combustion devices such as internal combustion engines, it is highly desirable to maintain an accurately determined fuel-air ratio and that it is often desirable that such ratio be varied in a precisely predetermined manner over a given range of operating conditions of the engine. For example, in the case of an air-craft engine, it is desired to maintain the fuel-air ratio substantially constant under normal operating conditions but when maximum power is required, as during acceleration, it is desired to enrich the fuel-air mixture and conversely, when cruising over long distances, it is frequently desirable to reduce the fuel-air ratio to obtain maximum gasoline economy. In order to be able accurately to control the fuel-air ratio of a combustion device, it is desirable to have a continuous indication of the particular ratio obtaining at all times.

It is an object of the invention therefore to provide a new and improved ratio-measuring system which is effective continuously to measure the ratio of two variable quantities, such as the ratio of the air-mass flow and the fuel-mass flow, that is the fuel-air ratio of the input, to the combustion device.

It is another object of the invention to provide a ratio-measuring system of the type described which is simple and economical in construction and reliable in operation.

In accordance with the invention, a system for continuously measuring the ratio of two variable quantities, such as the fuel-air ratio of the input to a combustion device, comprises means for developing a first electrical signal varying with a first of the quantities, for example the air-mass flow, and means for developing a second electrical signal varying with the other of the quantities, for example the fuel-mass flow. The system also includes means for selecting an adjustable portion of one of the signals and means responsive to the difference between such portion of said one signal and the other of said signals for adjusting the selecting means to reduce the difference substantially to zero. The adjustment of the selecting means is then representative of the ratio of the two quantities, that is, of the fuel-air ratio of the input to the combustion device. By the term "measuring," as used herein and in the appended claims, is meant the derivation of an effect representative of the ratio of the two variable quantities which may be utilized to give an indication or record of such ratio or to effect a control in accordance therewith.

For a better understanding of the invention, together with other and further objects thereof, reference is had to the following description taken in connection with the accompanying drawings while its scope will be pointed out in the appended claims.

Referring now to the drawing, the single figure represents, partially schematically, a ratio-measuring system embodying the invention as applied to the measurement of the fuel-air ratio of the input to a combustion device, which may be an internal combustion engine.

Referring now to the drawing, there is represented, partially schematically, a system for continuously measuring the ratio of two variable quantities, such as the ratio of the fuel-mass flow to the air-mass flow, that is the fuel-air ratio of the input, to a combustion device 10, which may be an internal combustion engine. The system comprises an alternating-current supply circuit 11 which may be connected to any suitable source, such as a commercial 60-cycle power line, and from which the several elements of the system are energized. The system also includes means responsive to variations in a first of such quantities, for example the air-mass flow to the device 10, for developing a first effect varying with said quantity. This means may comprise an air-mass flowmeter 12 connected in an air-intake conduit 13 to the combustion device 10 and a voltage-divider resistor 14 connected across or otherwise coupled to the circuit 11 and including an adjustable contact element 14a actuated by the air-mass flowmeter 12 for developing an electrical signal varying with the air-mass flow to the device 10. If the air-mass flowmeter 12 is of the power output type, it may be connected directly to actuate the adjustable contact 14a or, if it is not of the power output type, it may be coupled thereto, as shown, through a torque amplifier 15. The air-mass flowmeter 12 may be of any suitable type such as of the types described in applicant's copending applications Serial Nos. 562,556 and 562,557, filed November 8, 1944, and Serial No. 583,094, filed March 16, 1945, all assigned to the same assignee as the present application.

The ratio-measuring system also includes means responsive to variations in the other of said quantities, that is the fuel-mass flow to the device 10, for developing a second effect of like type to the first effect varying with such other quantity. For example, this means may comprise a fuel-mass flowmeter 16 connected in a fuel-intake conduit 17 to the device 10 and a second voltage-divider resistor 18 connected or otherwise coupled to the circuit 11 and including an adjustable contact element 18a actuated by the fuel-mass flowmeter 16 for developing a second electrical signal varying in accordance with the fuel-mass flow to the device 10. Likewise, if the fuel-mass flowmeter 16 is of the power output type, it may be connected directly to actuate the adjustable contact 18a or, if it is not of the power output type, it may be coupled to the contact 18a through a torque amplifier 19, as shown. The fuel-mass flowmeter 16 may also be of any suitable type such as the type described in the copending application of applicant and Frank G. Willey, Serial No. 562,558, filed November 8, 1944, and assigned to the same assignee as the present application.

The system of the invention also includes means for selecting an adjustable portion of one of the developed effects, which may be a third voltage-divider resistor 20 connected across the portion of the voltage divider 14 selected by its contact 14a and having an adjustable contact 20a for selecting an adjustable portion of the first signal. There are also provided means responsive to the difference between the selected portion of the first effect or signal developed at the adjustable contact 20a and the other of the developed effects appearing at the adjustable contact 18a for adjusting the selecting means to reduce this difference substantially to zero. This responsive means may comprise a comparison circuit 21 interconnecting the contacts 20a and 18a of the voltage dividers 20 and 18, respectively, and including a comparing resistor 22 and means controlled by the comparison circuit for adjusting the contact 20a of the voltage divider 20 to balance the comparison circuit. This balancing means may comprise a polyphase reversible motor 23 connected to actuate the adjustable contact 20a and having a first phase winding 23a connected across the supply circuit 11 and having a second phase winding 23b excited from the comparison circuit 21 through an amplifier and phase shifter 24 having its input terminals connected across the resistor 22 and its output terminals connected to the phase winding 23b of the motor 23. The unit 24 is designed to apply to the phase winding 23b an alternating potential which is in quadrature with the potential applied to the phase winding 23a from the circuit 11 and leading or lagging in accordance with the sense of unbalance of the comparison circuit 21 to produce rotation of the motor 23 in a proper direction to rebalance the comparison circuit.

With the arrangement described, the adjustment of the selecting means, that is the contact 20a of voltage divider 20, is representative of the ratio of the two quantities being measured, that is of the fuel-air ratio of the input to the combustion device 10. Therefore, there may be provided ratio-indicating means such as an indicating scale 20b associated with the voltage divider 20 and a pointer element 20c which may constitute an extension of the adjustable contact 20a and is therefore adjustable in accordance with the adjustment of the selecting contact 20a.

Either or both of the air-mass flowmeter 12 and the fuel-mass flowmeter 16 may have non-linear response characteristics or they may have dissimilar response characteristics, or both. In order to compensate for such non-linearities or dissimilarities, one or both of the voltage dividers 14 and 18 may be tapered or shaped to have a displacement-voltage characteristic proportioned to compensate for such non-linearities or such dissimilarities, or both. Or, in case only one of the devices 12 and 16 has a non-linear characteristic and in case this characteristic is extremely non-linear, the compensation may be divided between the voltage-dividers 14 and 18 by properly tapering or shaping their displacement-voltage characteristics.

In general, the system also includes means for adjusting the air-mass flow to the device 10, represented schematically as a valve 13a in the conduit 13, and for adjusting the fuel-mass flow to the device 10, represented schematically as a valve 17a in the fuel-intake conduit 17.

It is believed that the operation of the ratio-measuring system of the invention will be clear to those skilled in the art from the foregoing description. In brief, the voltage across the supply circuit 11 may be represented by $e_1$. The adjustable contact 14a actuated by the air-mass flowmeter 12 then develops an electrical signal which may be represented by the voltage $e_2$, varying with the air-mass flow to the device 10. Similarly, the voltage divider 18 develops at its contact 18a a voltage $e_3$ varying in accordance with the fuel-mass flow to the device 10. The adjustable contact 20a of voltage divider 20 selects an adjustable portion $e_4$ of the signal $e_2$. The difference between the voltages $e_4$ and $e_3$ is applied to the amplifier and phase shifter 24 which energizes the phase winding 23b of the motor 23 to actuate the motor in one direction or the other, depending upon the polarity of the unbalance voltage in the comparison circuit 21 developed across the resistor 22. The motor 23 then operates to adjust the contact 20a of voltage divider 20 until the portion $e_4$ of the voltage $e_2$ at the contact 14a selected by the contact 20a is equal to the voltage $e_3$, at which time the input to the amplifier 24 is reduced to zero and the system is in equilibrium. In such equilibrium condition, the adjustment or position of the contact 20a is representative of, or a function of, the fuel-air ratio of the input to the device 10. Therefore, by associating with the voltage divider 20 the fuel-air ratio indicator scale 20b, suitably calibrated, the pointer 20c thereof will give a continuous measurement of the fuel-air ratio of the input to the combustion device 10. It will be apparent that this measurement may be used to give either a visual indication, as shown, or may be utilized to operate a recording device or to effect a control of any desired operation, such as the operation of the valve 17a, to control the fuel-air ratio of the input to the device 10.

If the displacement-voltage characteristic of the voltage divider 14 is tapered or shaped to compensate for any non-linear response characteristic of the air-mass flowmeter 12 and its associated torque amplifier 15, the electrical signal appearing at the contact 14a will be a linear function of the air-mass flow to the device 10. Similarly, the electrical signal developed at the contact 18a of voltage divider 18 may be made a linear function of the fuel-mass flow to the device 10. In such case, the displacement-voltage or displacement-resistance characteristic of the voltage divider 20 may be linear. However, compensation for the non-linearities of response of the devices 12 and 16 may be distributed between the voltage dividers 14, 18 and 20 in any desired manner provided the fuel-air ratio scale 20b is properly calibrated.

It is to be understood that the voltage dividers 14 and 18 have displacement-resistance characteristics and adjustment ranges properly related to the characteristics of the amplifiers 15 and 19, respectively, and to each other to permit a balance of the voltage $e_2$, which is a fraction of the voltage $e_1$, against the voltage $e_3$, which is also a fraction of the voltage $e_1$, under normal operating conditions.

While there has been described what is at present considered to be the preferred embodiment of the invention, it will be apparent to those skilled in the art that various changes and modifications may be made therein without departing from the spirit or scope of the invention.

What is claimed as new is:

1. A system for continuously measuring the ratio of two variable quantities comprising, means for developing a first electrical signal varying with a first of said quantities, means for developing a second electrical signal varying with the other of said quantities, means for selecting an adjustable portion of one of said electrical signals, and means responsive to the difference between said portion of said one electrical signal and the other of said electrical signals for adjusting said selecting means to reduce said difference substantially to zero, the adjustment of said selecting means being representative of the ratio of said quantities.

2. A system for continuously measuring the ratio of two variable quantities comprising, an electric supply circuit, a pair of voltage dividers coupled to said supply circuit each including an adjustable contact, means for adjusting the contact of one of said dividers in accordance with variations of a first of said quantities, means for adjusting the contact of the other of said dividers in accordance with variations of the other of said quantities, a third voltage divider connected across the portion of one of said pair of dividers selected by its contact, a comparing circuit including the contacts of said third divider and the other of said pair of dividers, and means controlled by said comparison circuit for adjusting the contact of said third divider to balance said comparison circuit, the adjustment of the contact of said third divider being representative of the ratio of said other quantity to said first quantity.

3. A system for continuously measuring the ratio of two variable quantities comprising, an alternating-current electric supply circuit, a pair of voltage dividers coupled to said supply circuit each including an adjustable contact, means for adjusting the contact of one of said dividers in accordance with variations of a first of said quantities, means for adjusting the contact of the other of said dividers in accordance with variations of the other of said quantities, a third voltage divider connected across the portion of one of said pair of dividers selected by its contact, a comparison circuit including the contacts of said third divider and the other of said pair of dividers, and a phase-sensitive device responsive jointly to the phase of the energization of said comparison circuit and that of said supply circuit for adjusting the contact of said third divider to balance said comparison circuit, the adjustment of the contact of said third divider being representative of the ratio of said other quantity to said first quantity.

4. A system for continuously measuring the ratio of two variable quantities comprising, an alternating-current electric supply circuit, a pair of voltage dividers coupled to said supply circuit each including an adjustable contact, means for adjusting the contact of one of said dividers in accordance with variations of a first of said quantities, means for adjusting the contact of the other of said dividers in accordance with variations of the other of said quantities, a third voltage divider connected across the portion of one of said pair of dividers selected by its contact, a comparison circuit including the contacts of said third divider and the other of said pair of dividers, and a polyphase reversible motor having a phase winding excited from said comparison circuit and operable in a direction dependent upon the sense of unbalance of said comparison circuit for adjusting the contact of said third divider to balance said comparison circuit, the adjustment of the contact of said third divider being representative of the ratio of said other quantity to said first quantity.

5. A system for continuously measuring the ratio of two variable quantities comprising, an electric supply circuit, a pair of voltage dividers coupled to said supply circuit each including an adjustable contact, means for adjusting the contact of one of said dividers in accordance with variations of a first of said quantities, means for adjusting the contact of the other of said dividers in accordance with variations of the other of said quantities, a third voltage divider connected across the portion of one of said pair of dividers selected by its contact, a comparison circuit including the contacts of said third divider and the other of said pair of dividers, means controlled by said comparison circuit for adjusting the contact of said third divider to balance said comparison circuit, and ratio-indicating means associated with said third divider and including a pointer adjusted in accordance with adjustment of the contact thereof.

6. A system for continuously measuring the ratio of two variable quantities comprising, an electric supply circuit, a pair of voltage dividers coupled to said supply circuit each including an adjustable contact, means for adjusting the contact of one of said dividers in accordance with variations of a first of said quantities, means for adjusting the contact of the other of said dividers in accordance with variations of the other of said quantities, at least one of said dividers having a displacement-voltage characteristic proportioned to compensate for dissimilarities in the response characteristics of said adjusting means, a third voltage divider connected across the portion of one of said pair of dividers selected by its contact, a comparison circuit including the contacts of said third divider and the other of said pair of dividers, and means controlled by said comparison circuit for adjusting the contact of said third divider to balance said comparison circuit, the adjustment of the contact of said third divider being representative of the ratio of said other quantity to said first quantity.

7. A system for continuously measuring the ratio of two variable quantities comprising, an electric supply circuit, a pair of voltage dividers coupled to said supply circuit each including an adjustable contact, means for adjusting the contact of one of said dividers in accordance with variations of a first of said quantities, means for adjusting the contact of the other of said dividers in accordance with variations of the other of said quantities, each of said dividers having a displacement-voltage characteristic proportioned to compensate for any non-linearity in the response characteristic of its associated adjusting means, a third voltage divider connected across the portion of one of said pair of dividers selected by its contact, a comparing circuit including the contacts of said third divider and the other of said pair of dividers, and means controlled by said comparison circuit for adjusting the contact of said third divider to balance said comparison circuit, the adjustment of the contact of said third divider being representative of the ratio of said other quantity to said first quantity.

DAVID W. MOORE, JR.

REFERENCES CITED

The following references are of record in the file of this patent:

UNITED STATES PATENTS

| Number | Name | Date |
|---|---|---|
| 1,162,475 | Gibson | Nov. 30, 1915 |
| 2,154,523 | Midyette | Apr. 18, 1939 |
| 2,208,623 | Bond | July 23, 1940 |
| 2,217,642 | Luhrs | Oct. 8, 1940 |
| 2,232,077 | Rosecky | Feb. 18, 1941 |
| 2,261,087 | Jones | Oct. 28, 1941 |
| 2,286,864 | Luhrs | June 16, 1942 |
| 2,300,742 | Harrison | Nov. 3, 1942 |
| 2,316,240 | Harrison | Apr. 13, 1943 |
| 2,320,066 | Bristol | May 25, 1943 |
| 2,342,413 | Luhrs | Feb. 22, 1944 |
| 2,358,338 | Lilja et al. | Sept. 19, 1944 |

FOREIGN PATENTS

| Number | Country | Date |
|---|---|---|
| 431,850 | Great Britain | July 10, 1935 |
| 553,947 | Great Britain | June 11, 1943 |